US009997267B2

(12) United States Patent
Toth et al.

(10) Patent No.: US 9,997,267 B2
(45) Date of Patent: Jun. 12, 2018

(54) NUCLEAR REACTOR TARGET ASSEMBLIES, NUCLEAR REACTOR CONFIGURATIONS, AND METHODS FOR PRODUCING ISOTOPES, MODIFYING MATERIALS WITHIN TARGET MATERIAL, AND/OR CHARACTERIZING MATERIAL WITHIN A TARGET MATERIAL

(71) Applicants: Battelle Memorial Institute, Richland, WA (US); Washington State University, Pullman, WA (US)

(72) Inventors: James J. Toth, Pasco, WA (US); Donald Wall, Pullman, WA (US); Richard S. Wittman, Richland, WA (US); Bruce D. Pierson, Kennewick, WA (US); Lawrence R. Greenwood, Richland, WA (US)

(73) Assignees: Battelle Memorial Institute, Richland, WA (US); Washington State University, Pullman, WA (US)

( * ) Notice: Subject to any disclaimer, the term of this patent is extended or adjusted under 35 U.S.C. 154(b) by 235 days.

(21) Appl. No.: 13/766,600

(22) Filed: Feb. 13, 2013

(65) Prior Publication Data

US 2014/0226773 A1    Aug. 14, 2014

(51) Int. Cl.
  *G21G 1/02*      (2006.01)
  *G21C 23/00*   (2006.01)

(52) U.S. Cl.
  CPC ............... *G21G 1/02* (2013.01); *G21C 23/00* (2013.01)

(58) Field of Classification Search
  CPC ............. G21G 1/02; G21G 1/10; G21C 23/00
  (Continued)

(56) References Cited

U.S. PATENT DOCUMENTS 3,799,883 A   3/1974   Arino et al.
6,160,862 A   12/2000  Wiencek et al.
(Continued)

FOREIGN PATENT DOCUMENTS

GB    2098787 A  * 11/1982  ............... G21C 3/62
WO    WO 96/13039    5/1996
(Continued)

OTHER PUBLICATIONS

NUREG-1282. GA Technologies, Inc., "Safety Evaluation Report on High-Uranium Content, Low-Enriched Uranium-Zirconium Hydride Fuels for TRIGA Reactors," USNRC, Aug. 1987, pp. 1-14.*

(Continued)

*Primary Examiner* — Jack W Keith
*Assistant Examiner* — Lily C Garner
(74) *Attorney, Agent, or Firm* — Wells St. John P.S.

(57) ABSTRACT

Target assemblies are provided that can include a uranium-comprising annulus. The assemblies can include target material consisting essentially of non-uranium material within the volume of the annulus. Reactors are disclosed that can include one or more discrete zones configured to receive target material. At least one uranium-comprising annulus can be within one or more of the zones. Methods for producing isotopes within target material are also disclosed, with the methods including providing neutrons to target material within a uranium-comprising annulus. Methods for modifying materials within target material are disclosed as well as are methods for characterizing material within a target material.

14 Claims, 13 Drawing Sheets

(58) Field of Classification Search
USPC .................................... 376/159, 190, 202
See application file for complete search history.

(56) References Cited

U.S. PATENT DOCUMENTS

| | | | |
|---|---|---|---|
| 8,126,104 B2 | 2/2012 | Schenter et al. | |
| 2008/0013666 A1* | 1/2008 | Vaidyanathan | G21C 3/623 376/410 |
| 2009/0274258 A1* | 11/2009 | Holden | G21G 1/10 376/190 |
| 2011/0051874 A1* | 3/2011 | Allen | G21C 19/20 376/202 |
| 2011/0194662 A1 | 8/2011 | Nolen, Jr. et al. | |
| 2012/0027152 A1* | 2/2012 | Reese | G21G 1/02 376/190 |
| 2012/0109961 A1 | 5/2012 | Toth et al. | |

FOREIGN PATENT DOCUMENTS

| | | | | |
|---|---|---|---|---|
| WO | WO 2009135163 A2 * | 11/2009 | | G21B 1/01 |
| WO | WO 2012003009 A2 * | 1/2012 | | G21G 1/08 |

OTHER PUBLICATIONS

Zirconium: Covering for Fuel Rods. The New York Times. published Jun. 9, 1995. available online: <http://www.nytimes.com/1995/06/09/nyregion/zirconium-covering-for-fuel-rods.html>.*

Ashbaugh III, Charles E., "Gemstone Irradiation and Radioactivity", Gems & Gemology, 1988, pp. 196-213.
GA Technologies, Inc., "Safety Evaluation Report on High-Uranium Content, Low-Enriched Uranium-Zirconium Hydride Fuels for TRIGA Reactors", U.S. Nuclear Regulatory Commission, Office of Nuclear Reactor Regulation, Aug. 1987, 14 pages.
Hendricks et al., "MCNPX 2.6.0 Extensions", Los Alamos National Laboratory, Apr. 11, 2008, 73 pages.
Ma, Zhegang, "Development of Murr Flux Trap Model for Simulation and Prediction of Sample Loading Reactivity Worth and Isotope Production", A Dissertation presented to the Faculty of the Graduate School University of Missouri-Columbia, May 2007, 175 pages.
Palmer, "Hydraulic Shuttle Irradiation System (HSIS) Recently Installed in the Advanced Test Reactor (ATR)", Abstract, 2010 International Congress on Advances in Nuclear Power Plants (ICAPP' 10) ANS Annual Meeting Imbedded Tropical San Diego, CA, Jun. 13-17, 2010, 1 page.
Vandegrift et al., "Argonne-Design Annular LEU Foil Target and Possible Use in Alkaline-Based Processes", Checmical Sciences and Engineering Division, Argonne National Laboratory, 2010, 15 pages.
WO PCT/US2013/075121 Search Rept., dated Sep. 15, 2014, Battelle Memorial Institute.
WO PCT/US2013/075121 Writ Opin., dated Sep. 15, 2014, Battelle Memorial Institute.
WO PCT/US2013/075121 IPRP, Aug. 18, 2015, Battelle Memorial Institute.

* cited by examiner

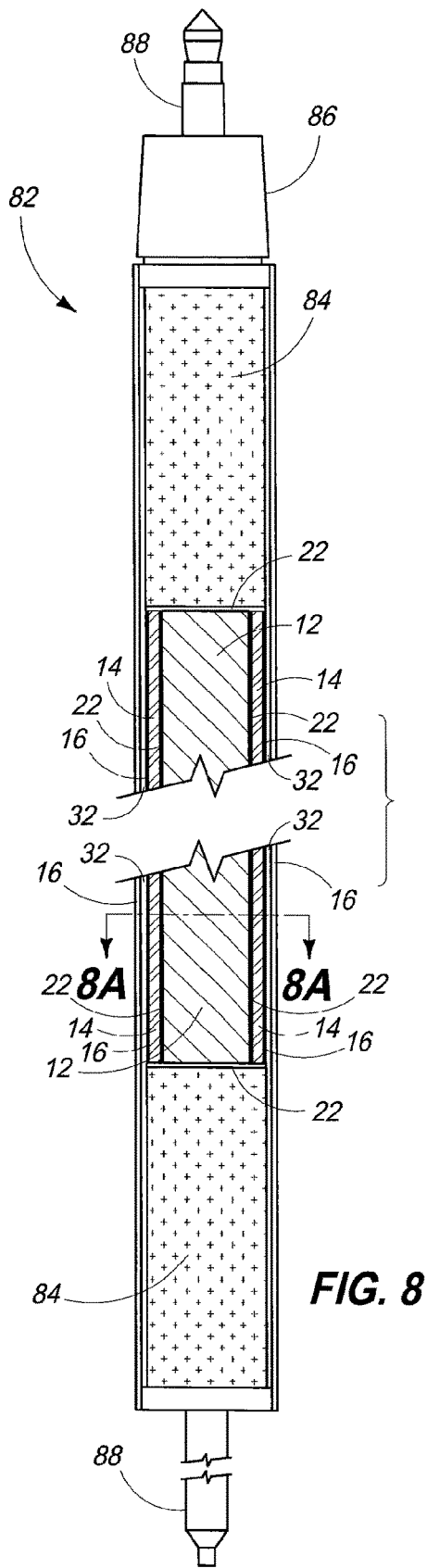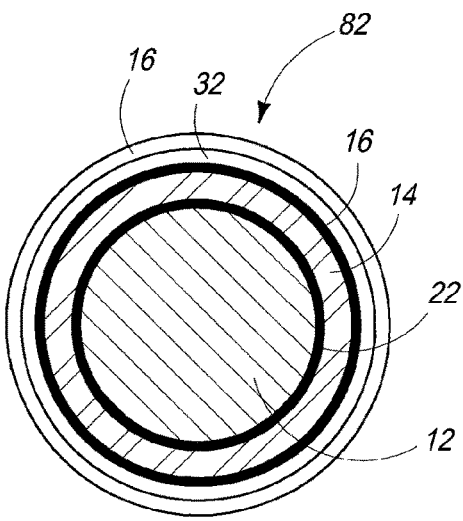
FIG. 8A
FIG. 8

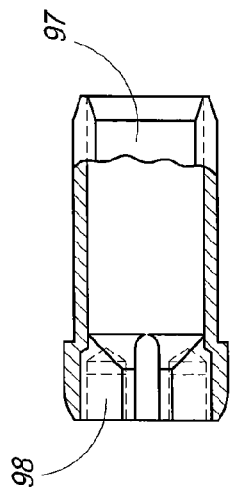
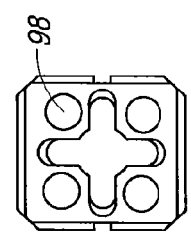
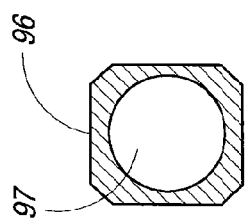
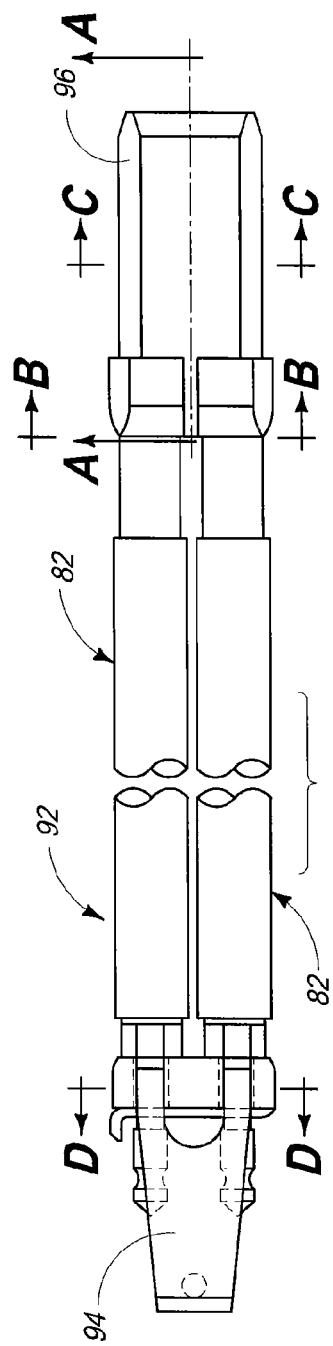
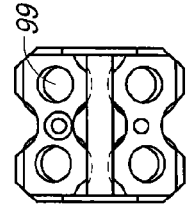

US 9,997,267 B2

NUCLEAR REACTOR TARGET ASSEMBLIES, NUCLEAR REACTOR CONFIGURATIONS, AND METHODS FOR PRODUCING ISOTOPES, MODIFYING MATERIALS WITHIN TARGET MATERIAL, AND/OR CHARACTERIZING MATERIAL WITHIN A TARGET MATERIAL

STATEMENT AS TO RIGHTS TO INVENTIONS MADE UNDER FEDERALLY-SPONSORED RESEARCH AND DEVELOPMENT

This invention was made with Government support under Contract No. DE-AC05-76RL01830 awarded by the U.S. Department of Energy. The Government has certain rights in the invention.

TECHNICAL FIELD

The present disclosure relates to nuclear reactors and target assemblies as well as methods for modifying material within those target assemblies. In pertinent embodiments, the disclosure relates to nuclear reactor target assemblies, nuclear reactor configurations, and methods for producing isotopes, modifying materials within target material, and/or characterizing material within a target material.

BACKGROUND

At the time of the filing of this application for patent, there is a significant unmet need for some isotopes. One such isotope is molybdenum-99 ($^{99}$Mo). Radioisotopes have a significant utility for a wide range of medical applications (see, e.g., U.S. Pat. No. 8,126,104) and commercial quantities of radioisotopes such as molybdenum-99 have been produced in nuclear reactors over the years through the uranium fission process (see, e.g., U.S. Pat. No. 3,799,883).

SUMMARY OF THE DISCLOSURE

It is at least one objective of the present disclosure to provide a radioisotope production target assembly and methods for its use which can overcome one or more of the disadvantages of using a uranium material target. At least one advantage of embodiments of the present disclosure is the substantial amount of isotope that can be produced. Embodiments of the disclosure can eliminate significant amounts of unwanted fission products from the product radioisotope and what may accompany same as a large array of concomitant undesirable infrastructure, health, security, and waste issues and/or associated costs required for this separation. Another advantage of embodiments of the disclosure is the substantial amount of isotope such as $^{99}$Mo that can be produced.

Target assemblies are provided that can include a uranium-comprising annulus, with the annulus defining an outer diameter and an inner diameter, and the inner diameter defining a volume within the annulus. The assemblies can include target material within the volume of the annulus, with the target material consisting essentially of non-uranium material.

Reactors are disclosed that can include one or more discrete zones configured to receive target material. At least one uranium-comprising annulus can be individually within one or more of the zones. The annulus can define an outer diameter and an inner diameter, the inner diameter defining a volume within the annulus, the volume configured to receive the target material within an entirety of the volume in at least one cross section.

Methods for producing isotopes within target material are also disclosed, with the methods including providing neutrons to target material within a uranium-comprising annulus; and the target material consisting essentially of non-uranium material. By using the annulus of the target assembly described herein, isotopes can be prepared at a desired activity level using a lower neutron flux than would be needed for the same target material without the uranium-comprising annulus.

Methods for modifying materials within target material are disclosed as well. The methods can include providing neutrons to target material within a uranium-comprising annulus, with the target material consisting essentially of non-uranium material.

Methods for characterizing material within a target material are further provided, with the methods including providing filtered neutrons to the target material within a uranium-comprising annulus to activate the material for neutron activation analysis. The methods can utilize target material consisting essentially of non-uranium material.

Methods for producing isotopes within a target material are also disclosed, with the methods including providing a neutron flux within a target assembly housing an annulus encompassing target material. The neutron flux can be lower than that necessary to produce substantial amounts of isotope in another target assembly that does not house an annulus.

DRAWINGS

Embodiments of the disclosure are described with reference to the following accompanying drawings.

FIG. 8 is a view of a cross section of a target assembly according to an embodiment of the disclosure.

FIG. 8A is a view of another cross section of the target assembly of FIG. 8 according an embodiment of the disclosure.

FIG. 9 is a cluster of target assemblies according to an embodiment of the disclosure.

FIGS. 9A-9D are views of cross sections of the cluster of FIG. 9 according to embodiments of the disclosure.

DESCRIPTION

This disclosure is submitted in furtherance of the constitutional purposes of the U.S. Patent Laws "to promote the progress of science and useful arts" (Article 1, Section 8).

Figures 1A, 1B:
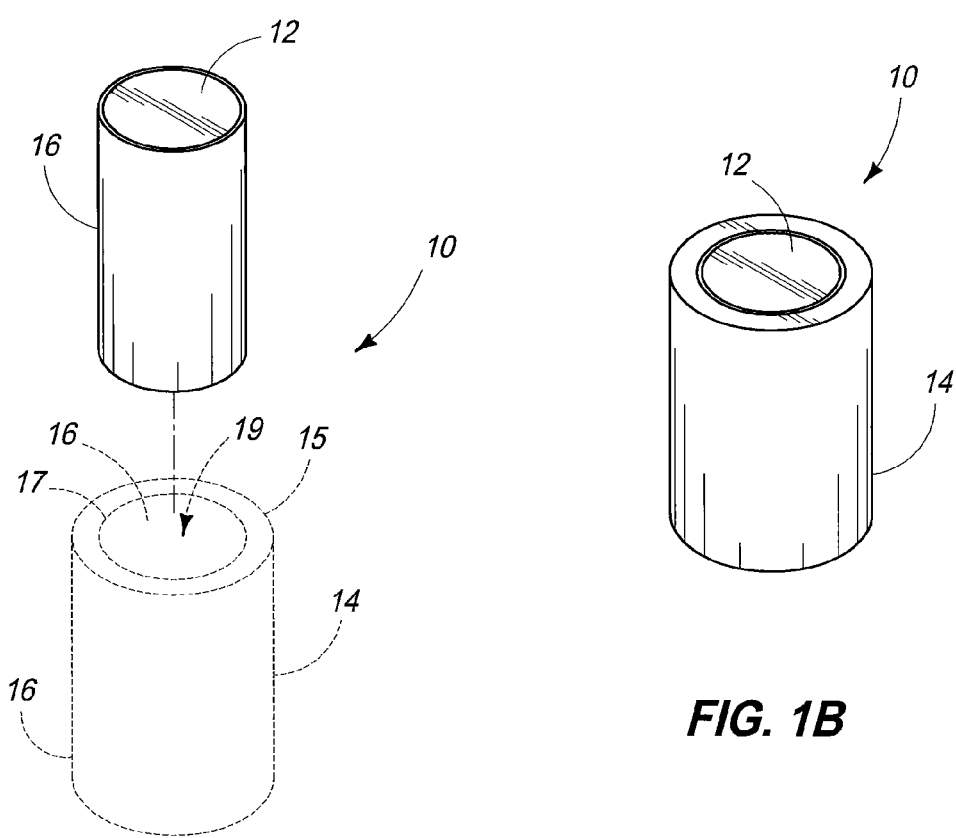
FIG. 1A is an exploded view of a target assembly according to an embodiment of the disclosure.
FIG. 1B is another view of the target assembly of FIG. 1A according to an embodiment of the disclosure.

The assemblies, reactors and/or methods of the present disclosure will be described with reference to FIGS. 1-15. Referring to FIGS. 1A and 1B, an example target assembly 10 is shown. Target assembly 10 can include a uranium-comprising annulus 14. The annulus can define an outer diameter 15 and an inner diameter 17. The inner diameter can define a volume 19 within annulus 14. According to example implementations, annulus 14 can comprise less than about 20% enrichment of $^{235}U$. In accordance with other embodiments, annulus 14 can include an alloy of uranium and erbium, for example. According to another embodiment, annulus 14 can comprise uranium-zirconium alloys (UZr) and/or uranium-zirconium-hydride ($UZrH_x$).

Figures 2A, 2B:
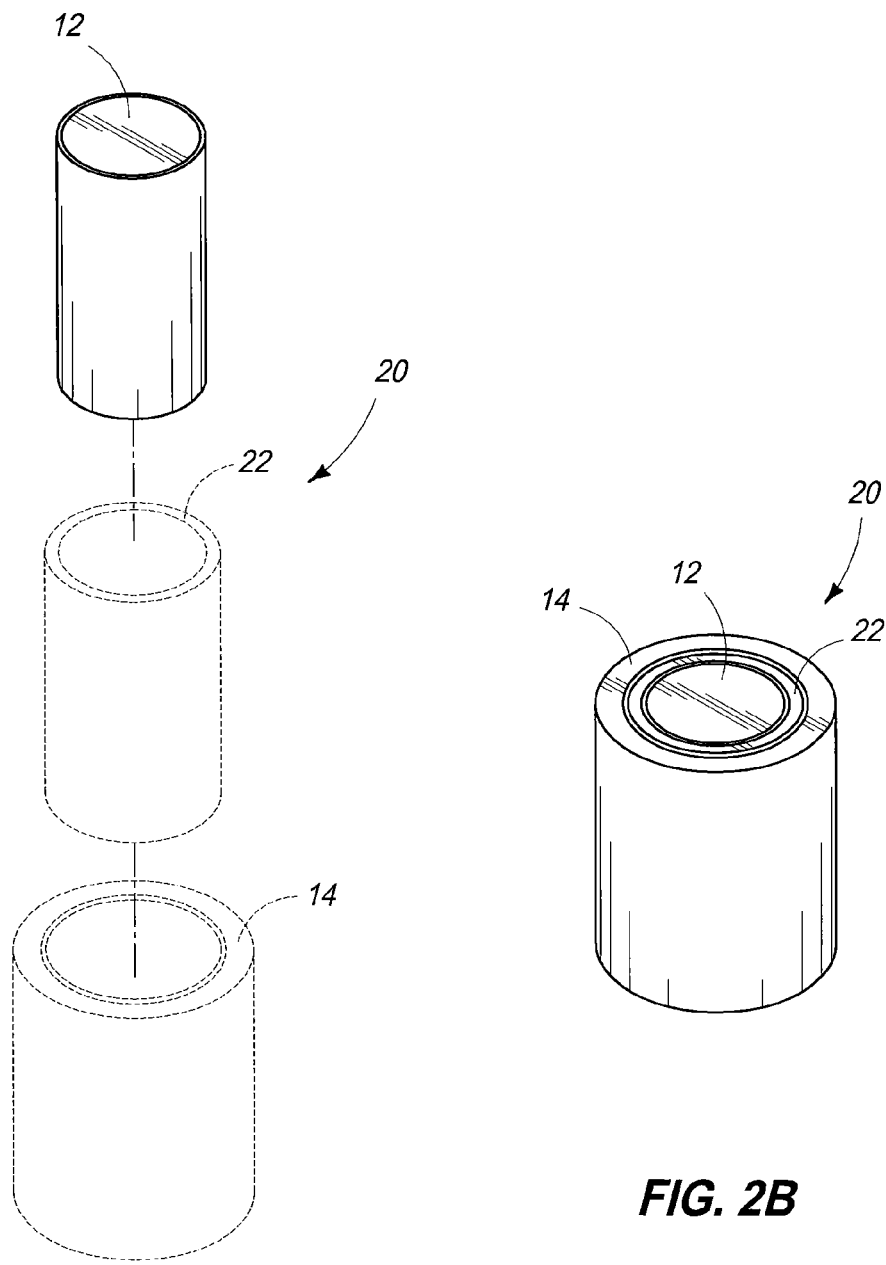
FIG. 2A is an exploded view of a target assembly according to an embodiment of the disclosure.
FIG. 2B is another view of the target assembly of FIG. 2A according to an embodiment of the disclosure.

In accordance with example implementations shown in FIGS. 1A, 1B, and in FIGS. 2A and 2B, the annulus may have at least one cross section. The distance between inner diameter 17 and outer diameter 15 may range from about 100 μm to about 1 cm in one cross section. In accordance with example implementations, annulus 14 can define a length extending between opposing openings to volume 19. This length can range from 0.5 to 50 cm. In accordance with example embodiments, the length can be greater than 1 cm and/or less than 38 cm, for example.

Assembly 10 can also include a target material 12 that may be received within volume 19 of annulus 14. Target material 12 can consist essentially of non-uranium-comprising material. Material 12 can "consist essentially of" non-uranium-comprising material when, the material contains uranium, if at all, it is contained in such insubstantial amounts that the uranium does not require removal from the target material, and/or does not provide decay products that require removal from the target material. Non-uranium-comprising material may also be material requiring no special uranium related radiological or health physics protocols for handling or for transporting the material; such as safety and/or disposal procedures. Accordingly, material 12 may contain inconsequential amounts of uranium and/or consist of non-uranium-comprising material. In accordance with example implementations, material 12 can include at least one of Mo, P, S Ir, Au, Re, and/or Cr. Material 12 can have a diameter less than about 10 cm or more specifically a diameter from about 500 micron to about 5 cm; Material 12 can also have a length of about 3 cm; and multiple discrete target materials can be engaged within volume 19 of annulus 14. For example, annulus 14 may have a length of about 38 cm and material and/or materials 12 may occupy all or a portion of volume 19 of that length. In accordance with example implementations, material 12 may occupy a terminal 12.7 to 15 cm of the length of annulus 14; accordingly this can include the bottom 12.7 to 15 cm of the length of annulus 14, for example.

One or both of target material 12 and/or annulus 14 can include cladding 16 extending entirely or at least partially over any or all surfaces. The cladding can include Zr, zircalloy and/or stainless steel, for example. Material 12 can be configured to be removeably coupled to annulus 14.

Referring to FIGS. 2A and 2B, target assembly 20 is shown in accordance with another embodiment. In accordance with example implementations, assembly 20 can include target material 12 as well as annulus 14. However, in between target material 12 and annulus 14 can be a liner 22. This liner can be associated with the inner diameter of annulus 14, for example. The liner can comprise boron, boron carbide, boron nitride, and/or cadmium, for example. Liner 22 can be commensurate in length with the length of target material 12 and/or may be commensurate in length with the length of the inner diameter of annulus 14, for example. An example thickness of liner 22 comprised of cadmium can be 390 micro-meters thick but may be as thick as about 5 centimeter. In accordance with example implementations, target material 12, liner 22 and/or annulus 14 may be configured to slidably engage one another to form a portion or all of target assembly 20.

Figures 3A, 3B:
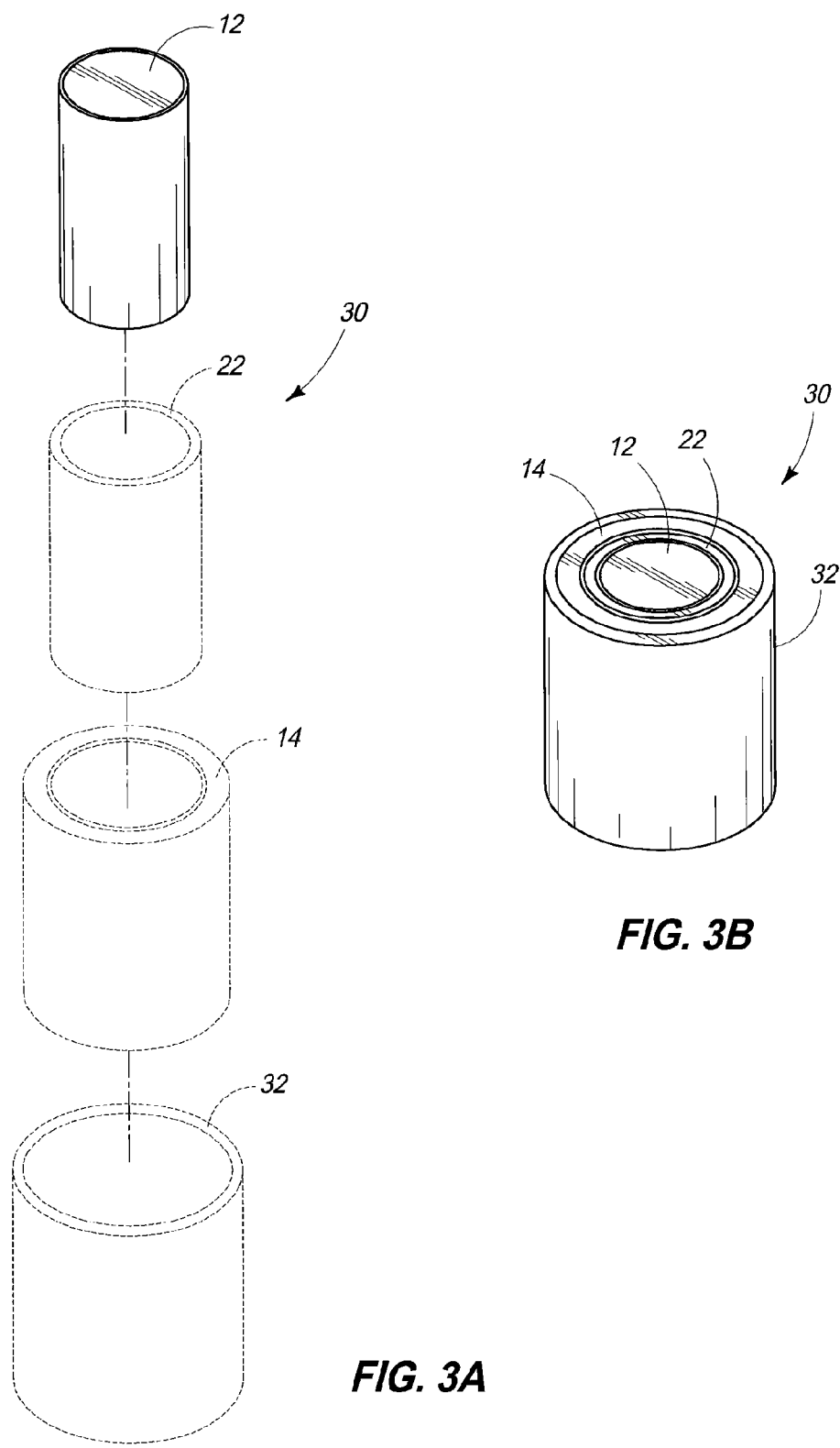
FIG. 3A is an exploded view of a target assembly according to an embodiment of the disclosure.
FIG. 3B is another view of the target assembly of FIG. 3B according to an embodiment of the disclosure.

Referring next to FIGS. 3A and 3B, a target assembly 30 is shown that includes target material 12, liner 22, annulus 14 and reflector 32. Reflector 32 can include beryllium or lead. In accordance with example implementations, reflector 32 may also include a mixture of beryllium and/or lead with other compositions such as graphite, for example. Reflector 32 may have a cross section that defines a thickness less than about 5 cm, for example, and it may be configured as one or more components that are arranged along a perimeter of the target material and/or annulus. In accordance with example implementations, reflector 32 may have a 0.16 cm thickness with an inner radius of 1.74 cm in one cross section.

Figures 4, 4A:
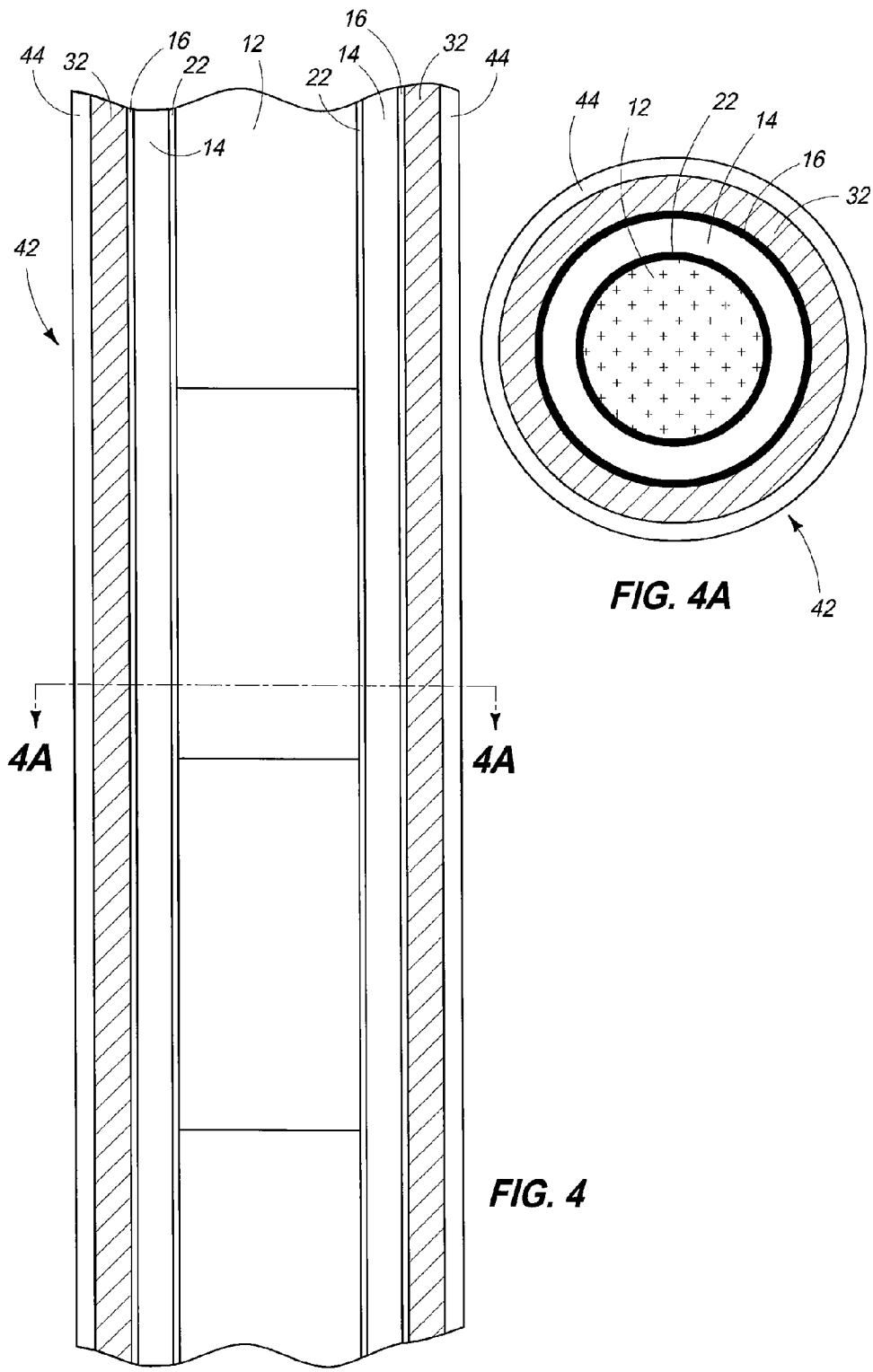
FIG. 4 is a view of a cross section of a target assembly according to an embodiment of the disclosure.
FIG. 4A is a view of another cross section of the target assembly of FIG. 4 according an embodiment of the disclosure.

Referring to FIGS. 4 and 4A, target assembly 42 is shown in accordance with another embodiment. FIG. 4 represents at least one cross section of target assembly 42 and FIG. 4A represents a transverse cross section of target assembly 42 as well. Accordingly, a volume within annulus 14 is defined in at least one cross section. Target material 12 can occupy an entirety of the volume defined in this cross section. Assembly 42 can include additional components, such as cladding, liners, and/or reflectors. In accordance with example implementations, material 12 can occupy an entirety of the volume defined in the cross section inclusive of these additional materials. For example, where assembly 42 includes liner 22, a volume is defined in the one cross section and material 12 can occupy an entirety of this volume.

In accordance with example implementations, target assembly 42 can be configured as a can. As such, target assembly 42 can include a can wall 44 that may include aluminum, for example, and adjacent can wall 44 can be reflector 32. Cladding 16 can be over annulus 14 having liner 22 between annulus 14 and target material 12. As can be seen in FIG. 4, assembly 42 can include multiple discrete target materials 12.

Figures 5, 5A:
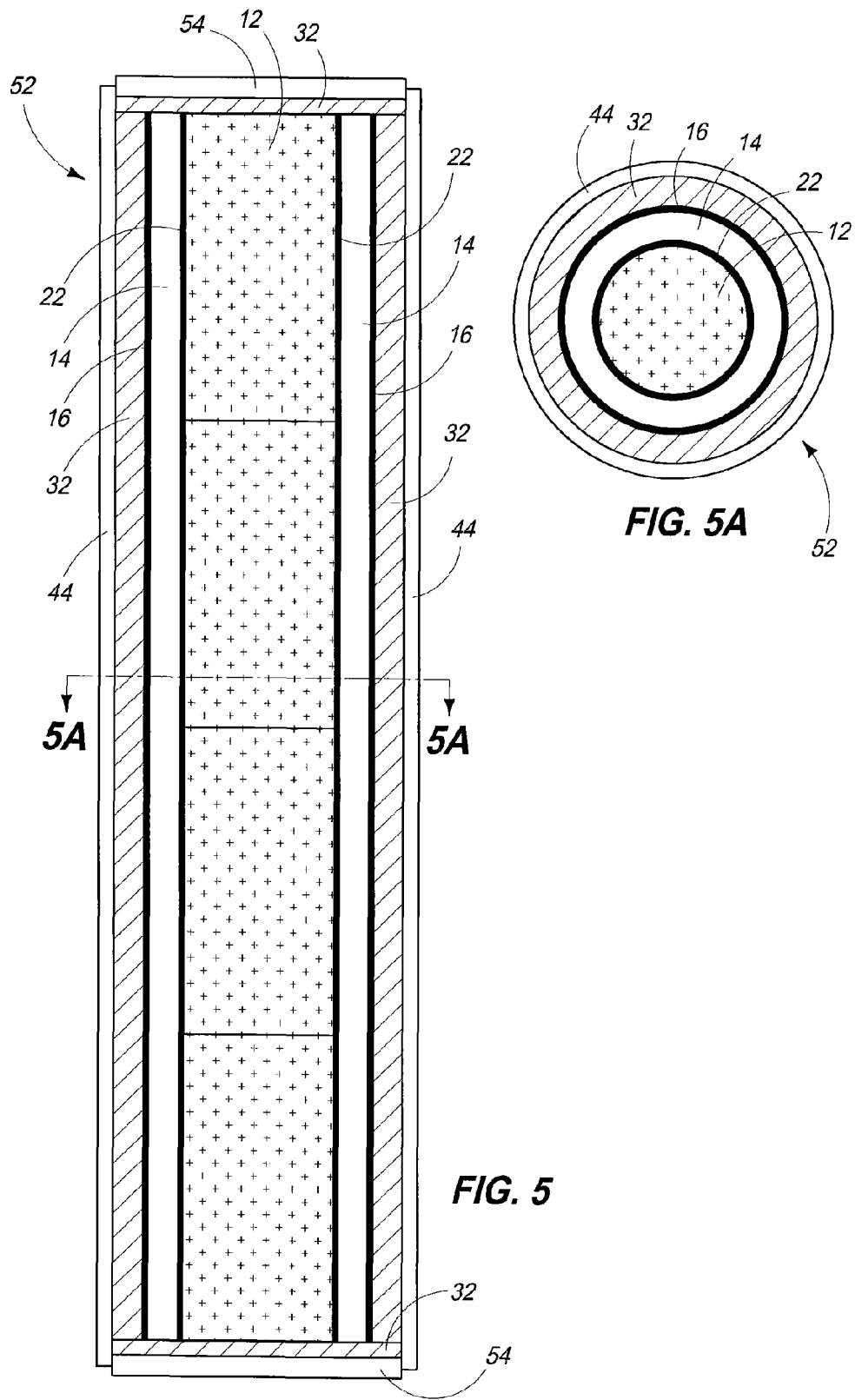
FIG. 5 is a view of a cross section of a target assembly according to an embodiment of the disclosure.
FIG. 5A is a view of another cross section of the target assembly of FIG. 5 according an embodiment of the disclosure.

Referring next to FIGS. 5 and 5A, another target assembly 52 is shown that includes at least one cross section shown in FIG. 5 and a transverse cross section shown in FIG. 5A. In accordance with example implementations, can wall 44 can encompass reflector material 32 which can be associated with cladding 16 of annulus 14 having liner 22 between annulus 14 and target material 12. In accordance with example implementations, target assembly 52 can include one or more caps 54; and disposed adjacent caps 54 can be additional reflector material 32.

The mass of the entire target assembly (as shown in FIGS. 1, 2, 3, 4 and 5) can be from about 10 grams to about 5000 grams. In accordance with example implementations, the mass can be from about 50 grams to 3000 grams. The diameter of the entire target assembly can be from about 1 centimeter to about 20 centimeters. In accordance with example implementations, the diameter can be from about 3 to 6 centimeters.

Figure 6:
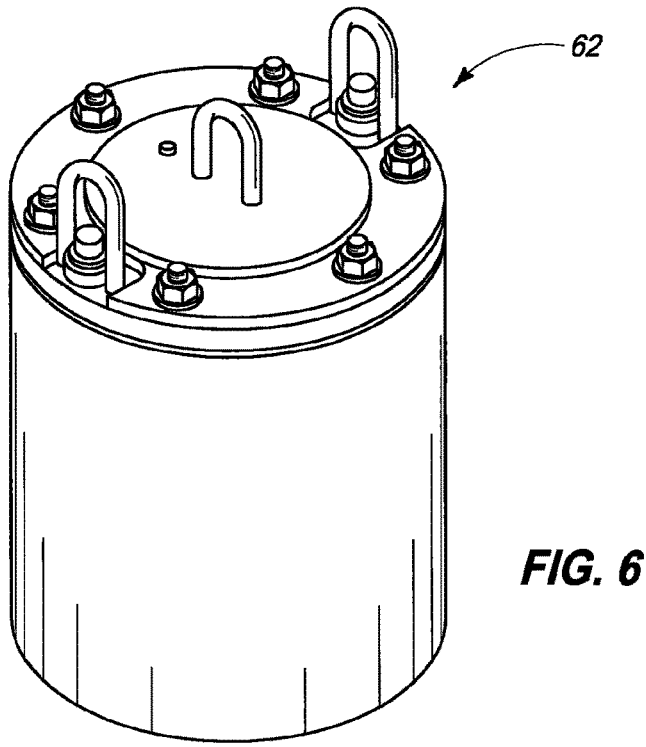
FIG. 6 is an example transfer cask according to an embodiment of the disclosure.
Figure 7:
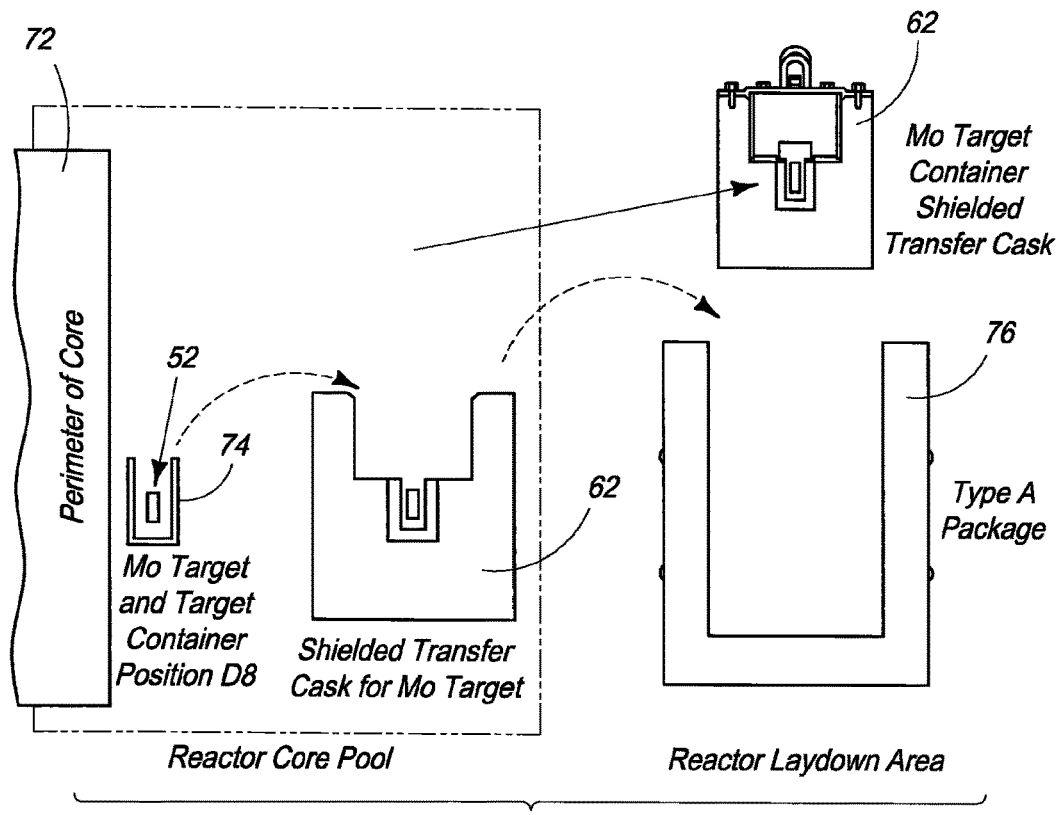
FIG. 7 is a schematic diagram illustrating an example of a target assembly transfer method according to an embodiment of the disclosure.

Referring to FIG. 6, a transfer cask assembly 62 is shown for use with target assemblies such as target assembly 52 in the form of a can configuration. Referring to FIG. 7, a reactor core pool can have a perimeter of core 72 and a discrete zone 74 configured to receive a can assembly such as target assembly 52. Prior to reaction, target material 12 can include grams of 99.999% pure molybdenum metal powder, for example. According to example implementations, discrete zone 74 can be at a position such as D8 (described later with reference to reactors as 126 in FIG. 12). Assembly 52 can be removed and transferred to a transfer cask assembly 62 and eventually transferred to a reactor laydown area 76.

Referring to FIGS. 8 and 8A, target assembly 82 is shown according to another embodiment of the disclosure. Target assembly 82 is shown in one cross section in FIG. 8 and a transverse cross section in FIG. 8A. In accordance with example implementations, target assembly 82 may also be considered a fuel element arrangement. Target assembly 82 can include a cladding 16 encompassing additional cladding over annulus 14 having liner 22 in between annulus 14 and target material 12. In accordance with example implementations, target assembly 82 can include fixtures 88. Fixtures 88 can be configured to be received by portions of a cluster assembly to allow for the transfer of assembly 82. Fixture 88 can be used to grasp assembly 82 for movement into and out of the irradiation position within a reactor, for example. Assembly 82 may also include liner material 22 associated with target material 12. Liner material 22 can be placed in between target material 12 and reflector material 84 as well, and reflector material 84 can be an upper and/or lower reflector. Reflector material 84 can be a mixture of graphite and beryllium, for example. Reflector material 84 may also function as a packing material in some implementations. Material 86 is an upper cap/fixture that can provide a method for attaching fixture 88 to the assembly 82.

Referring to FIG. 9, a cluster assembly 92 is shown that includes one or more elements 82 coupled to base 96 and handle 94. Cross sections of cluster assembly 9 are shown in FIG. 9A-9D. Referring to FIG. 9A, a recess 97 is shown within base 96 that also includes sockets 98 that are configured to receive fixtures 88, for example. Additionally, referring to FIG. 9B, socket 98 is shown according to another cross section, and referring to FIG. 9D, socket 99 is shown and configured to receive another fixture 88, for example. In accordance with example implementations, base 96 may be configured as shown in FIG. 9C.

Figure 10:
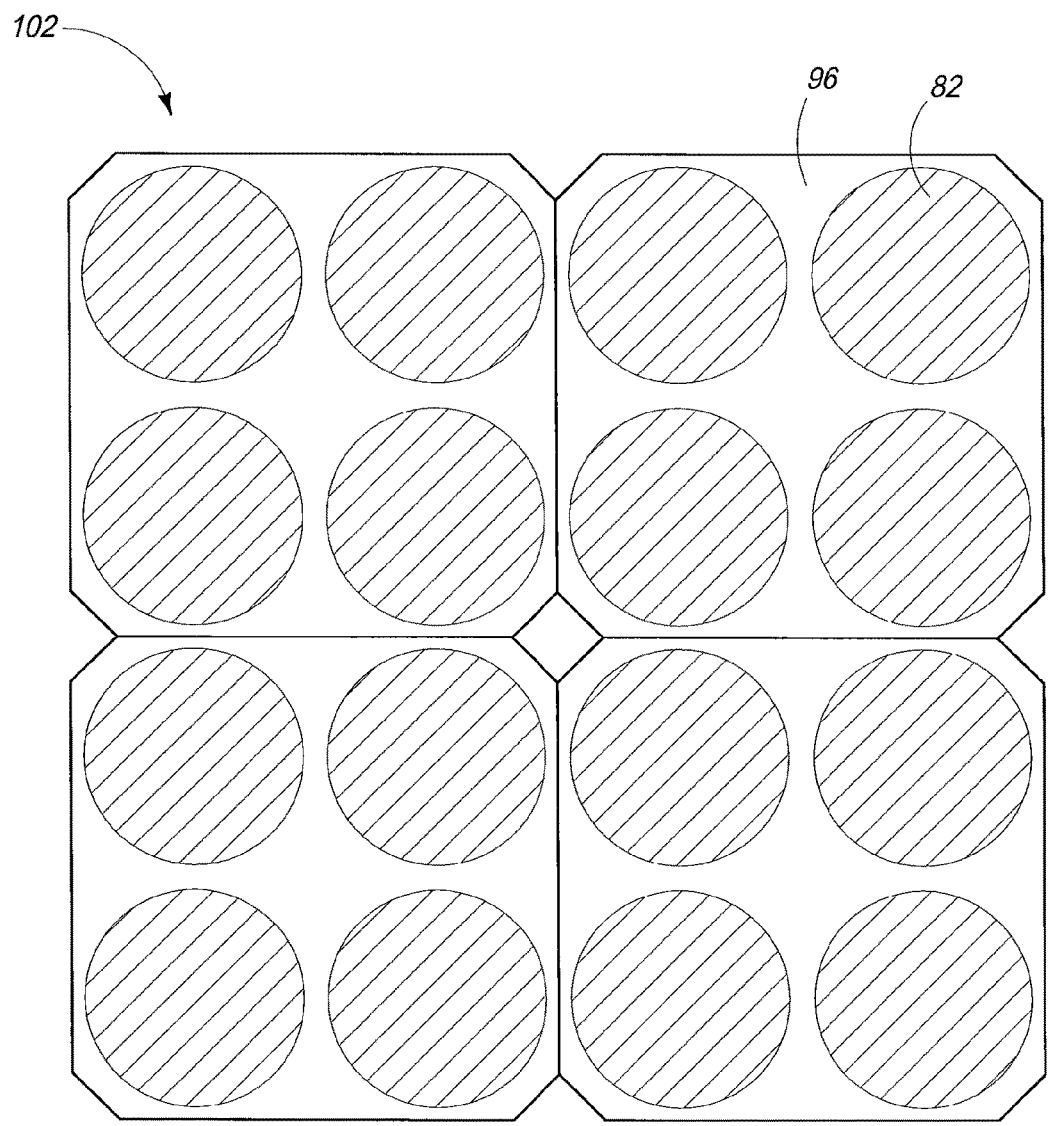
FIG. 10 is an arrangement of clusters according to an embodiment of the disclosure.
Figure 10A:
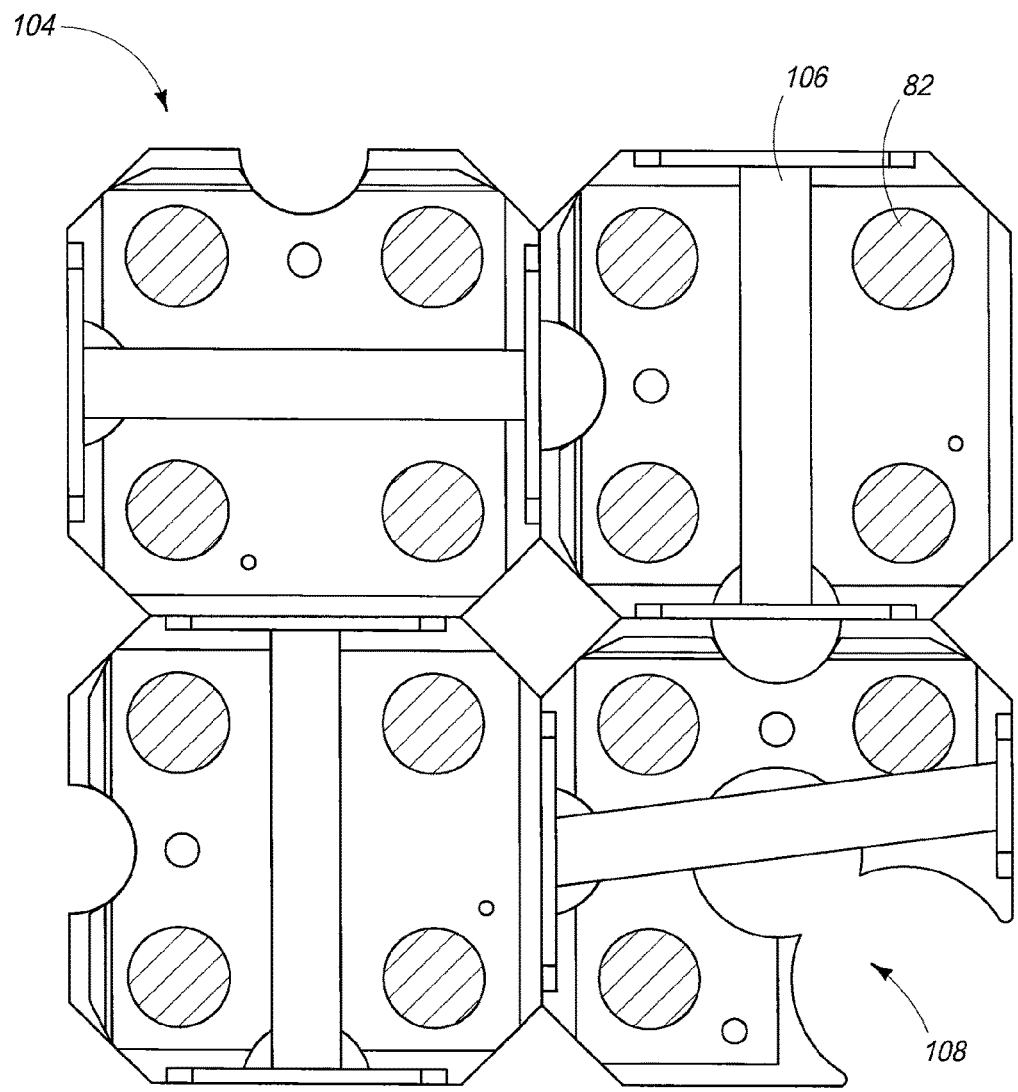
FIG. 10A is another arrangement of clusters according to another embodiment of the disclosure.

Referring to FIG. 10, an arrangement 102 is shown that shows a cross section of different base arrangements 96 having assemblies 82 therein. In accordance with another example embodiment and with reference to FIG. 10A, arrangement 104 can include clusters having a handle 106 with a cutout 108 to provide clearance for the removal of an annulus without requiring removal of the entire fuel assembly to retrieve the target.

Figure 11:
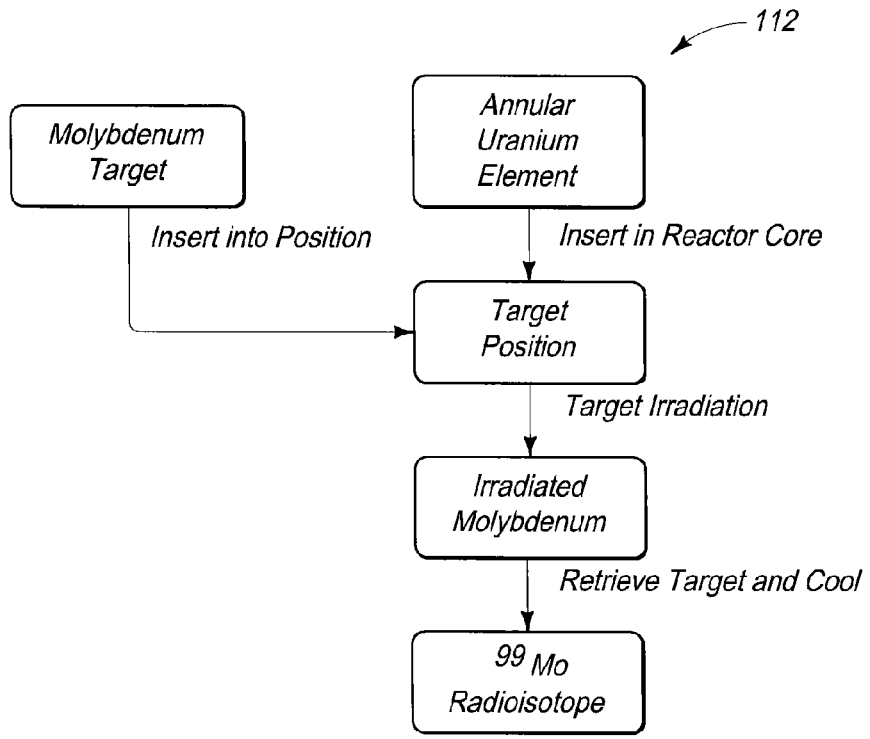
FIG. 11 is a flow diagram illustrating an example scheme for irradiating target assemblies according to an embodiment of the disclosure.

In accordance with example implementations and with reference to FIG. 11, at least one example of a flow diagram for reacting target material as configured in the present disclosure is provided. In accordance with one example, a molybdenum target can be inserted into a position with an annular uranium element. The target can be irradiated. The irradiated molybdenum can be retrieved and cooled. Cooling can allow for short half life trace materials such as $^{41}$Ar to decay away providing a $^{99}$Mo radioisotope.

Figure 12:
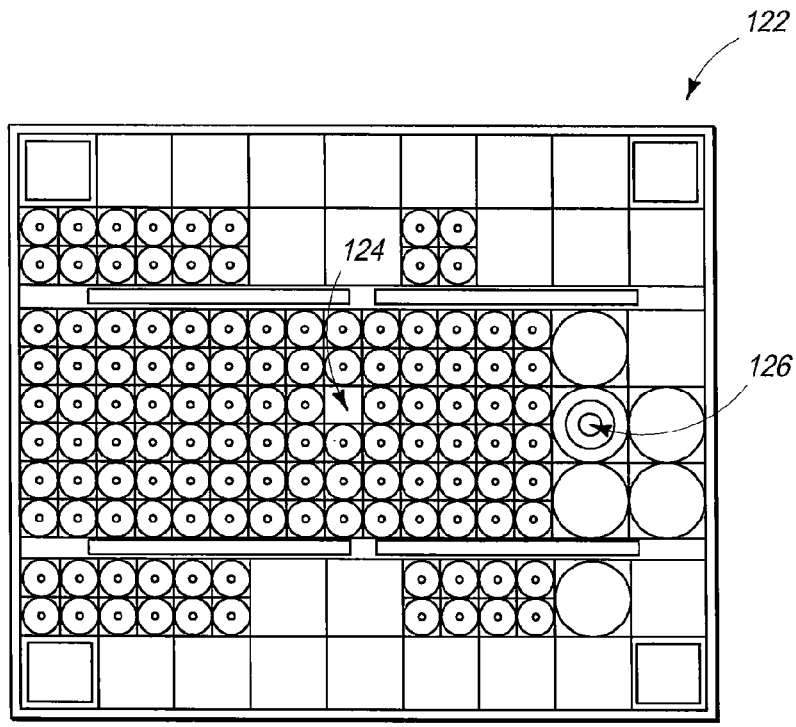
FIG. 12 is a plan view of an example reactor according to an embodiment of the disclosure.

Referring to FIG. 12, an example reactor 122 is shown. Reactor 122 can have one or more discrete zones configured to receive target material; a core position 124, for example, as well as a perimeter position 126, sometimes referred to as the D8 position, can be considered to be one or more of these zones.

The target material can consist essentially of non-uranium material as described herein. Reactor 122 can also include at least one uranium-comprising annulus individually with the one or more discrete zones, the annulus being as described herein with the volume of the annulus configured to receive an entirety of the target material in at least one cross section. In accordance with example implementations, the annulus can be coupled to the reactor and/or may also be removable from the reactor. Neutrons can be provided by the reactor to the target material as a neutron flux which is increased within the annulus as a result of the concentrating effects of the annulus, for example. Discrete zones may also include one or more reflector components arranged along the perimeter of the target material and/or annulus. Methods also include reflecting of the neutrons by, e.g., the reflector components, to create a flux trap within the annulus. The discrete zone may also include one or more liners associated with the inner diameter of the annulus. The methods can also include filtering the neutrons as they are provided to the target material. In accordance with example implementations, liners 22 comprised of materials such as cadmium or boron compounds can be selected that absorb the thermal neutrons produced in the reactor core, allowing the epithermal and fast neutrons to selectively pass to the target material. For purposes of illustration only, the thermal neutron spectrum can include energy levels less than 1 electron-volt (eV). The epithermal or resonance neutron spectrum can include energy levels greater than 1 eV but less than about 0.5 MeV, while the fast neutron spectrum can include energy levels greater than about 0.5 MeV. In accordance with additional embodiments, the production of the high energy neutrons using the target assembly may be used to treat or to modify materials such as gemstones. Gemologists treat gems such as topaz with epithermal and fast neutrons, for example.

The target material as described above can consist essentially of non-uranium-comprising material, such as P, S, Ir, Au, Re, Cr and Mo. The neutrons that interact with the target material can produce one or more of $^{32}$P, $^{35}$S, $^{192}$Ir, $^{198}$Au, $^{186}$Re, $^{51}$Cr, and $^{99}$Mo. Accordingly, methods are also provided for modifying materials within target material. The methods can include providing neutrons to target material with a uranium-comprising annulus. Methods are also provided for characterizing material within a target material. The method can include providing filtered neutrons to the target material within a uranium-comprising annulus to activate the material for neutron activation analysis. In accordance with example characterization implementations, the target material can be placed in the target assembly with a liner composed of cadmium or boron carbide, and radiation provided to create a reasonably fast neutron spectrum, inside the target material so that the effects of fast neutrons can be used to characterize the target material. In a method for producing radioisotopes, using one or more of these assemblies, reactors, and/or methods when the target material is molybdenum can give a molybdenum-99 activity of at least 1 Ci/g, but it can also range from 1-25 Ci/g. Other activity can include 0.2-50 Ci/g. In order to provide target assemblies to reactors and remove from same, rabbit or shuttle systems can be utilized. Rabbit systems can include pneumatic systems to automatically transport the target material to and from the reactor core. For example, the target material can be positioned in a transport capsule, and the transport capsule can be positioned into the sending station of the pneumatic tube. The target material in the capsule can then be pneumatically transported to the reactor core. At the completion of the designated irradiation period, the target material in the capsule can then be pneumatically transported to the receiving station of the pneumatic tube.

Figure 13:
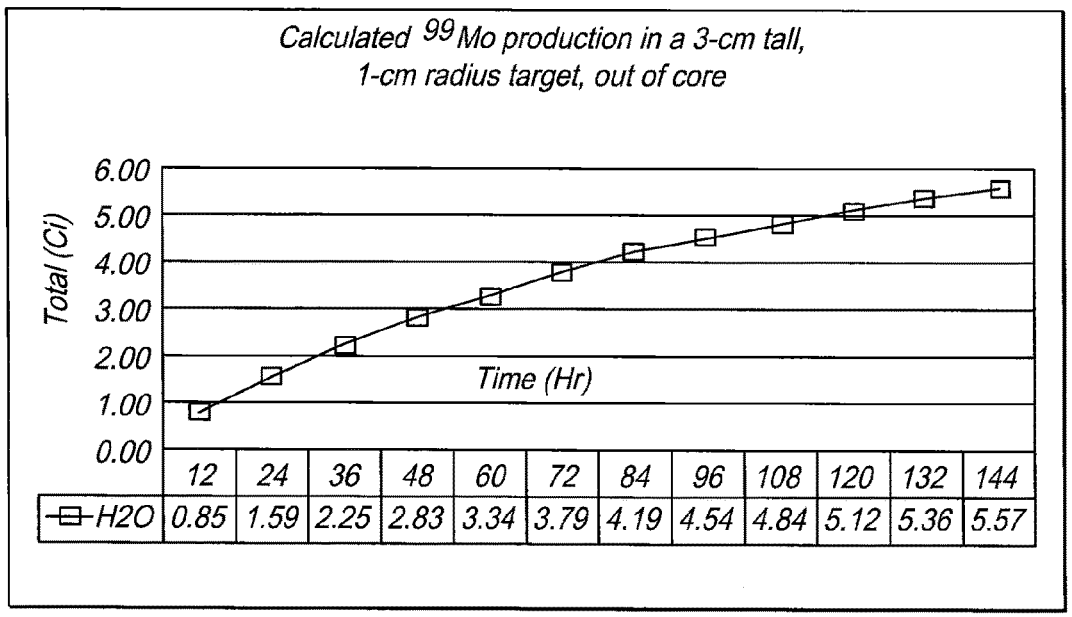
FIG. 13 is example data acquired using the assemblies, reactors, and/or methods of the present disclosure.
Figure 14:
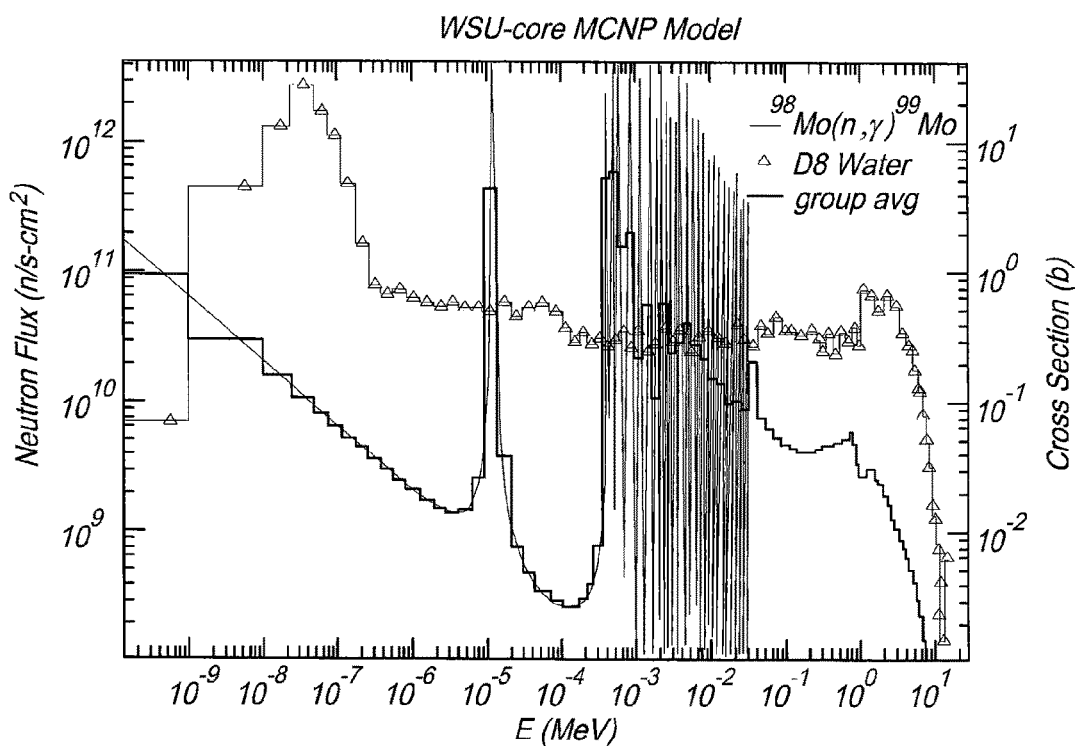
FIG. 14 is example data acquired using the assemblies, reactors, and/or methods of the present disclosure.
Figure 15:
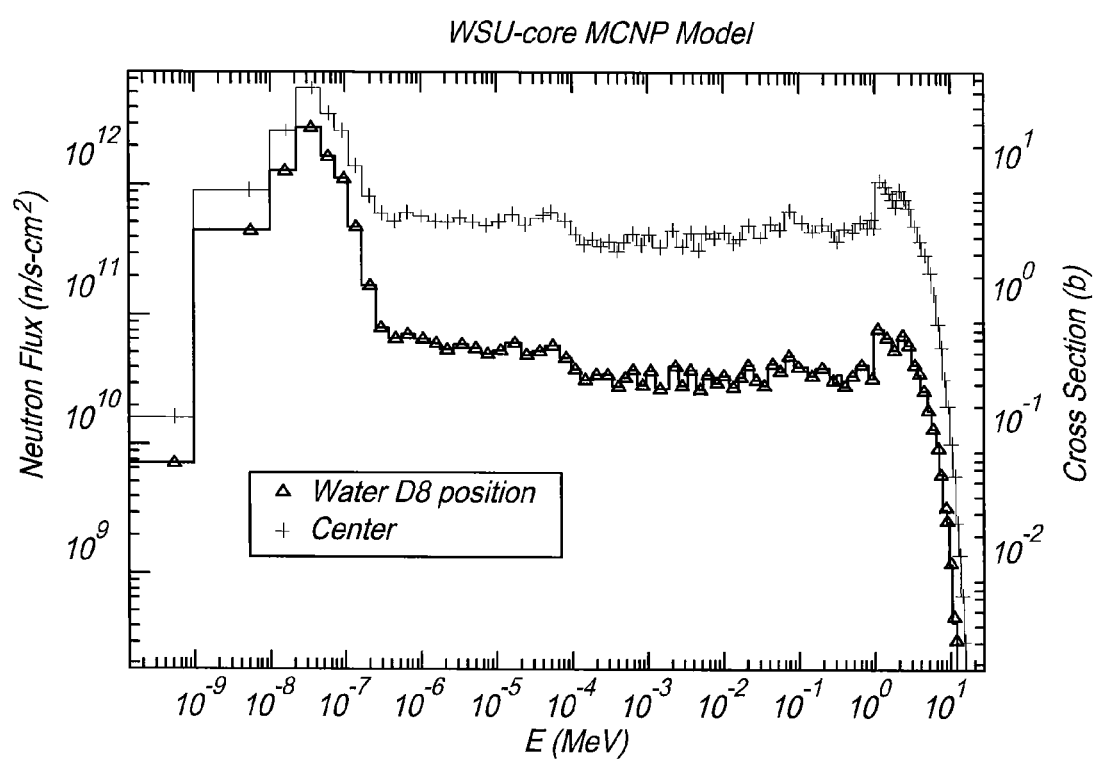
FIG. 15 is example data acquired using the assemblies, reactors, and/or methods of the present disclosure.

By way of example and for purposes of example only, FIGS. 13-15 depict data acquired from different target configurations in the core of research test reactors using uranium zirconium hydride (UZrH$_x$) fuel. Modeling the performance of unique target assemblies under a variety of conditions can be performed consistent with MCNPX 2.6.0 Extensions, by Hendricks et. al., 2008). The data can be based on the core design and fuel configuration of the research reactor located at Washington State University (WSU) in Pullman, Wash. The research reactor at WSU is a 1-MegaWatt with Training, Research, Isotopes, General Atomics (TRIGA) fuel and a thermal neutron flux of about 2e10$^{12}$ neutron/centimeter$^2$-sec outside the core. In this case "outside the core" refers to position 126 on FIG. 12. The profile of the predicted neutron flux is depicted in FIG. 15, where "Water D8 position refers to 126 and "Center" refers to 124 of FIG. 12. Example target materials included pressed molybdenum with a bulk density of 8 g/cc. The target configurations could include 1) molybdenum cylinders, 2) molybdenum cylinders and annuli surrounded by beryllium, and 3) molybdenum cylinders surrounded by UZrH fuel with and without beryllium or lead reflectors/absorbers. The configurations are further described below in relation to the discrete zone in which the target assembly may be placed within the reactor:

Water Hole D8—calculations for very small target only for reference information. (Core position D8 refers to the perimeter of the core surrounded by the core pool as shown as 126 in FIG. 12.)
  Water Hole D5—11 slugs/target material 3 cm tall, 2 cm diameter stacked from core center. (Core position D5 refers to a location at the core center as shown as 124 in FIG. 12.)
Beryllium Shield—Same configuration as water hole above except shielded with beryllium shield.
  Be Shield—11 slugs/target material 3 cm tall, 2 cm diameter stacked from core center with a 0.25-cm beryllium reflector surrounding the molybdenum.
  Be Cylinder—11 annuli 3 cm tall, 0.25 cm thick, inner diameter 2 cm with a beryllium cylinder 2 cm in diameter at the center.
Fuel Annulus—1 molybdenum slug/target material 38 cm tall, 2 cm diameter inside of a fuel annulus 0.7 cm thick, inner radius 1.05 cm.
  Fuel Annulus+Be—same as above but surrounded by a beryllium reflector 0.16 cm thick and an inner radius of 1.74 cm. In practice the outer radius of the fuel annulus would be 1.75 cm, so the inner radius of the beryllium reflector would be slightly larger.
  Fuel Annulus+Pb—same as above, but replace beryllium with lead (Pb).
  Fuel Annulus+Be-Hydrogen—same as "Fuel Annulus+Be" except the hydrogen inside the zirconium hydride fuel can be removed from the material description.
  Fuel Annulus+Pb-Hydrogen—same as "Fuel Annulus+Pb" but hydrogen has been omitted from the fuel material description.

Each of the test conditions described above is based on 144 hours of irradiation. FIG. 13 shows the production of $^{99}$Mo in a specimen target located out-of-core from 12 to 144 hours. After 72 hours, the production of $^{99}$Mo is 3.8 curie. After 144 hours, the production of $^{99}$Mo is only 5.6 Ci, or only 1.8 Ci more than produced during the first 72 hours. The two target positions for the purpose of modeling calculations are graphically shown in FIG. 12 as positions 124 and 126. Position 126 (D8) is outside of the core, and position 124 (D5) is inside the core where the higher flux is produced.

Each core position (D5) may have four fuel elements configured as shown in FIGS. 9 and 10, for example. A molybdenum target can replace one of the fuel elements in the assembly. The modeling results are shown in Table 1 below. The data can indicate that it is possible to produce about 1000 Ci @ 1.0 Ci/g in a single fuel annulus and a beryllium reflector (1 target position at peak flux in D5). Alternatively, about 1000 Ci @ 0.4 Ci/g may be produced with a larger molybdenum target cylinder in just water. The data further indicates that a four-fold increase in the total curie values can be achieved with four targets replacing four fuel locations. A four-fold improvement in production and in specific activity can be achieved by replacing the natural molybdenum target (24% $^{98}$Mo) with an enriched $^{98}$Mo target (96% $^{98}$Mo).

TABLE 1

Summary of Data-144-Hr Irradiation of In-Core Mo Metal Powder; 8 g/cc, 2-cm Diameter

| Geometry | $^{99}$Mo Activity (Ci) | Activity (Ci/gm) | Cell Mass (g) | |
|---|---|---|---|---|
| Water Hole D8 Out of core | 5.57 | 0.074 | 75.39 | (a) |
| Water Hole | 31.78 | 0.4216 | 75.39 | (a) |
| Beryllium Reflector | 31.65 | 0.4199 | 75.39 | (a) |
| Beryllium Center | 33.70 | 0.4471 | 75.39 | (a) (b) |
| Fuel Annulus | 852.0 | 0.8921 | 955.04 | |
| Fuel Annulus + Beryllium Reflector | 960.7 | 1.0059 | 955.04 | |
| Fuel Annulus + Lead Reflector | 941.1 | 0.9854 | 955.04 | |
| Fuel Annulus − Hydrogen | 728.1 | 0.7624 | 955.04 | |
| Fuel Annulus − Hydrogen + Beryllium Reflector | 962.7 | 1.0080 | 955.04 | |
| Fuel Annulus − Hydrogen + Lead Reflector | 830.2 | 0.8693 | 955.04 | |

(a) These values are for the center of the core for a 3-cm-tall target; all other cases correctly average over the entire core height of 38 cm.
(b) The molybdenum annulus was 0.25 cm thick.

Referring to FIGS. 14 and 15, example data demonstrating neutron flux is shown. Accordingly, FIG. 14 demonstrates a Log-Log plot superimposing the neutron flux of position D8 in water with the cross section for $^{98}$Mo(n, gamma)$^{99}$Mo. The group average shows the integrated flux over the discrete 95 energy bins. FIG. 15 demonstrates a Log-Log plot superimposing the neutron flux of position D8 in water (out-of-core) with center of the core (position D5) in the research reactor.

In accordance with example implementations, the irradiated target material can be processed utilizing the materials and/or methods described in US patent publication US2012/0106691 to Toth et al. entitled "Method and System for Radioisotope Generation", published May 3, 2012; the entirety of which is incorporated by reference herein.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A target assembly for a nuclear reactor, the target assembly comprising:
 a solid annulus comprising uranium, and defining an outer circumference and an inner circumference, the inner circumference defining a volume within the solid annulus;
 a solid target material within the volume of the annulus, the solid target material consisting essentially of non-uranium material and comprising at least one of Mo, P, S, Ir, Au, Re, and/or Cr;
 the solid target material consisting of a plurality of longitudinally stacked nuclear fuel pellets;
 at least one liner arranged along the inner circumference of the solid annulus, the at least one liner operable to absorb thermal neutrons and allow epithermal and fast neutrons to selectively pass to the target material during irradiation;
 wherein the solid target material spans the volume defined by the at least one liner; and
 wherein the solid annulus is configured to be distinct from and removably coupled to the solid target material following irradiation.

2. The target assembly of claim 1 further comprising one or more reflector components arranged along a perimeter of one or both of the solid target material and solid annulus.

3. The target assembly of claim 2 wherein the one or more reflector components comprise beryllium (Be) or lead (Pb).

4. The target assembly of claim 2 wherein the one or more reflector components, in at least one cross section, defines a thickness less than about 1 cm.

5. The target assembly of claim 1 wherein the at least one liner comprises one or more of boron, boron carbide, boron nitride, and cadmium.

6. The target assembly of claim 1 further comprising cladding over at least a portion of a surface of one or both of the solid annulus and solid target material.

7. The target assembly of claim 6 wherein the cladding comprises one or more of zirconium, zircalloy and stainless steel.

8. The target assembly of claim 1 wherein the solid annulus comprises uranium having an enrichment of $^{235}$U of less than about 20%.

9. The target assembly of claim 1 wherein the solid annulus comprises an alloy of uranium and erbium.

10. The target assembly of claim 1 wherein the solid annulus comprises UZrH.

11. The target assembly of claim 1 wherein the solid annulus and solid target material are disposed within a can wall.

12. The target assembly of claim 1 configured as an element to be coupled with a plurality of other elements in a single assembly.

13. The target assembly of claim 1 wherein in at least one cross section the distance between the inner and outer circumference of the solid annulus is from about 100 μm to about 1 cm.

14. The target assembly of claim 1 wherein the solid annulus defines a length extending between opposing openings to the volume, the length being less than about 38 cm.

* * * * *